Dec. 12, 1972 TSUNEO KOSUGI 3,705,840

ROTATION SERVO SYSTEM WITH FREQUENCY AND PHASE ERROR CORRECTION

Filed Aug. 26, 1970 4 Sheets-Sheet 1

INVENTOR

TSUNEO KOSUGI

BY Louis Bernat

ATTORNEY

Dec. 12, 1972 TSUNEO KOSUGI 3,705,840

ROTATION SERVO SYSTEM WITH FREQUENCY AND PHASE ERROR CORRECTION

Filed Aug. 26, 1970 4 Sheets-Sheet 2

INVENTOR

TSUNEO KOSUGI

BY Louis Bernat

ATTORNEY

Dec. 12, 1972

TSUNEO KOSUGI

ROTATION SERVO SYSTEM WITH FREQUENCY AND PHASE ERROR CORRECTION 3,705,840

Filed Aug. 26, 1970

4 Sheets-Sheet 3

INVENTOR

TSUNEO KOSUGI

BY Louis Bernat

ATTORNEY

INVENTOR

TSUNEO KOSUGI

BY Louis Bernat

ATTORNEY

United States Patent Office 3,705,840

Patented Dec. 12, 1972

3,705,840

ROTATION SERVO SYSTEM WITH FREQUENCY AND PHASE ERROR CORRECTION

Tsuneo Kosugi, Yokohama, Japan, assignor to Victor Company of Japan, Ltd., Kanagawa-ken, Japan Filed Aug. 26, 1970, Ser. No. 67,118
Claims priority, application Japan, Aug. 27, 1969, 44/67,151
Int. Cl. G05d 13/62; G11b 15/52; H02p 7/06
U.S. Cl. 178—6.6 P 11 Claims

ABSTRACT OF THE DISCLOSURE

A rotation servo system controls a rotation of a motor by a closed servo loop. The closed servo loop includes means for comparing the phase of a signal which is generated responsive to the rotation of the motor with the phase of a reference signal, and means for frequency discriminating. The frequency discriminating means receives an output error signal from the phase comparing means and the rotation signal, and produces an output error signal responsive to the difference between the rotation signal and a presetting frequency.

This invention relates to a rotation servo system, and more particularly to a servo system for controlling the rotation of a motor in an apparatus for recording and reproducing a video signal on and from a magnetic medium.

An apparatus for recording and reproducing a video signal on and from a magnetic tape, by rotary magnetic heads, is hereafter referred to as VTR video tape recorder apparatus. The rotary magnetic heads are rotated by a motor (hereafter referred to as the head motor). The head motor may, for example, be a synchronous motor which may not cause a variation of rotation by changing of load. Then, in order to minimize the irregularities of rotation of the rotary magnetic heads, a rotary disk has been employed which has a large inertia. The magnetic heads are attached to the periphery of the disk. Therefore, the synchronizing motor used for the head motor has required a large driving torque and a synchronizing torque which is larger than that which is necessary for normal rotation. Consequently, the VTR apparatus has had to be larger in size than is really necessary.

On the other hand, an induction motor or a DC motor has a larger driving torque or higher efficiency thus, if either can be used as a head motor, it will minimize the size of the VTR apparatus. However, in this case, the rotation frequency of the induction motor or the DC motor may fluctuate responsive to changes of load or voltage. In consequence, the VTR apparatus in which the induction motor or the DC motor is employed as the head motor necessitates a complicated and high cost servo circuit. Also, there has been proposed a device in which, for example, the rotary magnetic heads are phase synchronized for rotation with a definite reference signal. The tape travel is controlled by a servo circuit in a capstan system. However, this device has had a complicated construction.

A more simplified servo system was further proposed. It could rotate the head motor in response to a control signal reproduced from a control track on the magnetic tape. In effect, this signal performs the servo control functions and enables the rotary magnetic heads to scan over the video track on the magnetic tape. Yet, this type of servo system has a disadvantage such that when a flutter occurs during the tape travel, the rotation of the head motor fluctuates and changes. At this instant, a jitter is produced in the reproduced signal. On the other hand, if the servo system is designed to be free of the flutter, the servo circuit cannot follow the phase of the reference signal. A difference is then caused between the reference signal frequency and the free-running frequency of rotation of the rotary magnetic heads. Or, when the load of the head motor changes and the rotation frequency varies, the tape speed is changed depending on the recording and reproducing periods.

For removing these disadvantages, there have been proposed the following systems: (1) A system for actuating a constant speed loop responsive to a discriminator output, which is proportional to the difference between a reference signal and a signal synchronized with the rotation of the rotary magnetic heads; (2) a system using a non-linear circuit for acccelerating the following up when the synchronization is pulled in and for delaying the following up when the phase has entered in a certain range; (3) a system for prearrangedly stabilizing the reference signal including wow and flutter; and (4) a system for frequency descriminating the reference signal and for controlling a preset frequency of a constant speed loop by the discriminated output. However, these conventional systems have had the following disadvantages: In the above system (1), the sensitivities of two discriminators cannot be brought into complete coincidence; in the system (2), the stability of the circuit is lowered in the vicinity of non-linear characteristic; in the system (3), the gain of the constant phase loop cannot be increased to a sufficiently large degree; and in the system (4), the circuit is too complicated.

It is, therefore, a general object of the present invention to provide a novel and useful servo system for a magnetic recording and reproducing apparatus which has eliminated all disadvantages of the conventional systems as hereinabove described.

Another object of the invention is to provide a system which can stably perform a servo operation over a wide range, the system having a very simple construction.

A further object of the invention is to provide a simple system which can actuate a DC amplifier with low gain and drive a DC motor by a simple servo operation.

Still a further object of the invention is to provide a simple system which enables a stable servo operation of the head motor to drive the rotary magnetic heads especially for use in a simple type portable VTR apparatus.

These and other objects and features of the invention will become more apparent from the description set forth hereafter when considered in conjunction with the accompanying drawings, in which.

Figure 1:
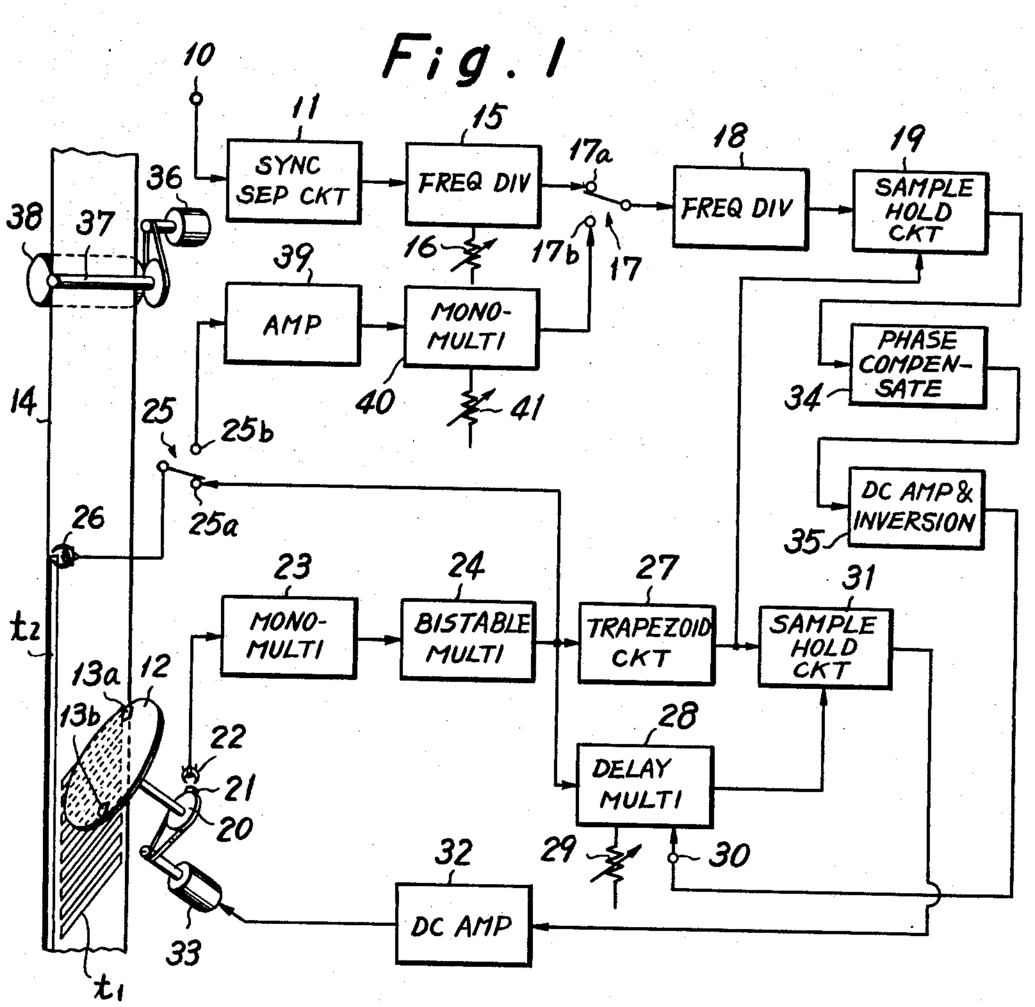
FIG. 1 is a block diagram of an embodiment of a system according to this invention.
Figure 4:
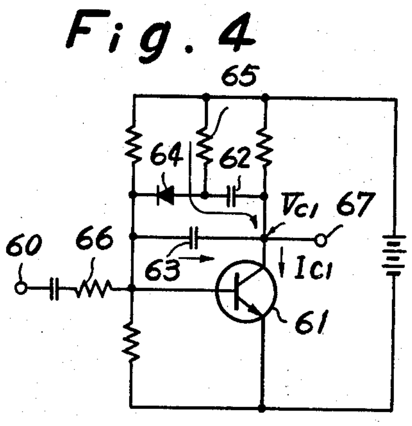
Figure 6:
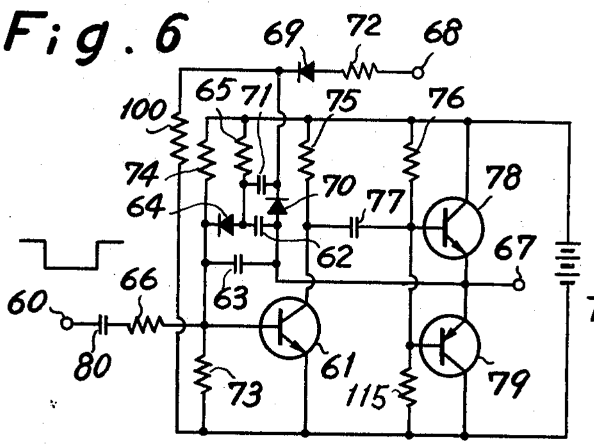
Figure 7:
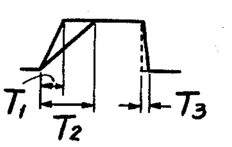

FIGS. 3(A) to (M) are, respectively, waveforms illustrating the phase relationship of signals at respective parts of the system as shown in FIG. 1;

FIG. 4 is a diagram showing the principle of a trapezoid circuit;

FIGS. 5(A) and (B) are waveforms of the circuit as shown in FIG. 4;

FIG. 6 is a circuit diagram of an actual embodiment of the trapezoid circuit;

FIG. 7 is a waveform of the circuit as shown in FIG. 6; and

Figure 8:
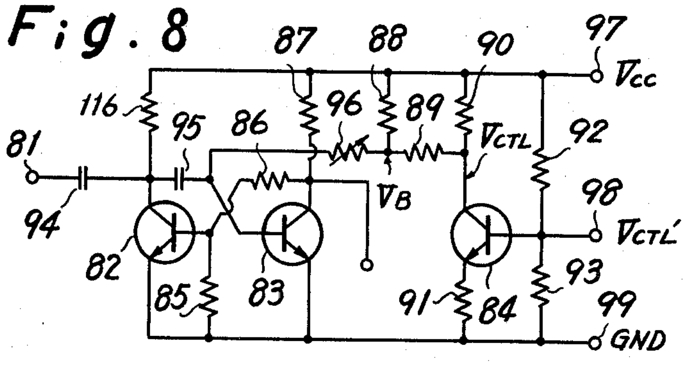

FIG. 8 is a circuit diagram of an embodiment of a voltage control frequency discriminator.

Figure 3:
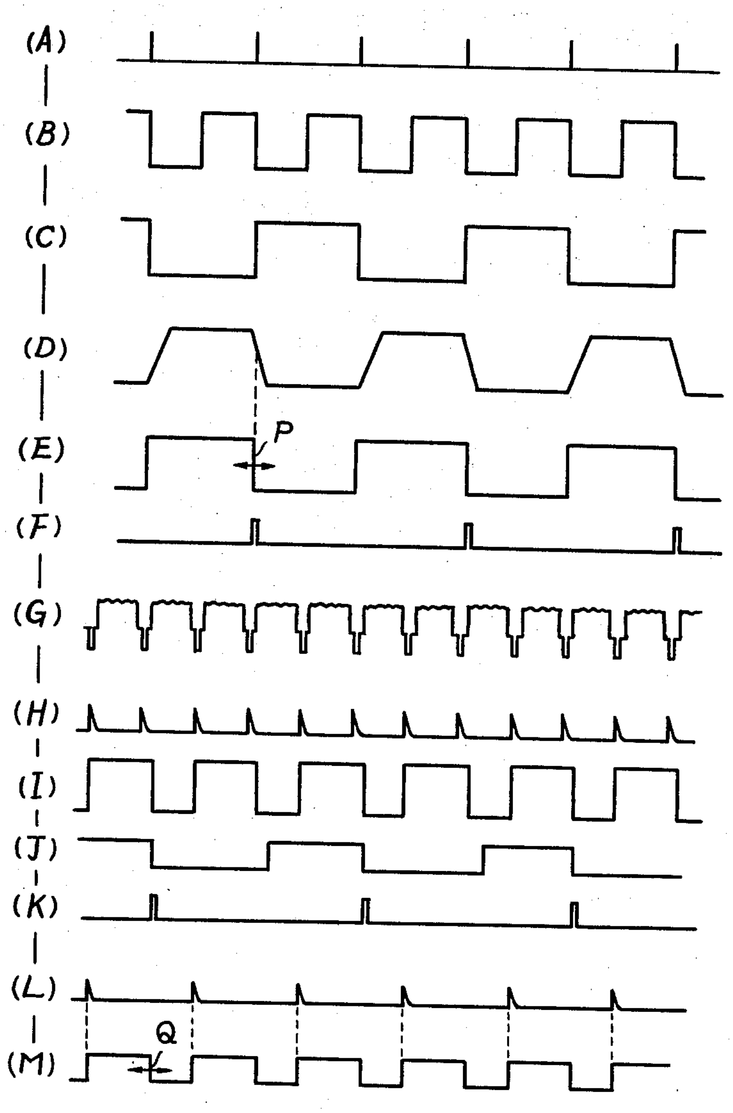

Referring to FIG. 1, an embodiment of the system of the present invention will now be described. A video signal having a vertical synchronizing signal [as shown in FIG. 3(G)] is supplied through an input terminal 10 to a vertical synchronizing signal separation circuit 11. This video signal is to be recorded in parallel tracks $t_1$, formed obliquely with respect to a longitudinal direction of a magnetic tape 14. These tracks are formed alternately by magnetic heads 13*a* and 13*b*. The magnetic heads 13*a* and 13*b* are oppositely positioned on the periphery of a rotary disk 12, in a diametrical position on the disk. In the circuit 11, the vertical synchronizing signals are separated from the video signal and formed into a series of pulses as shown in FIG. 3(H). These pulses are supplied to a frequency dividing circuit 15 and formed into a rectangular wave as shown in FIG. 3(I). A phase adjuster 16 adjusts a rotation phase of the rotary magnetic heads 13*a* and 13*b* to coincide with a phase of the vertical pulse, during a recording period. By adjusting the adjuster 16, the vertical synchronizing signals are located in parallel in predetermined positions on the magnetic tape 14.

In a recording mode, a movable contact member of a relay switch 17 is connected to a contact 17*a*. The rectangular wave output of the frequency dividing circuit 15 is fed through the switch 17 to a frequency dividing circuit 18. The rectangular wave is divided, in the frequency dividing circuit 18, into a signal of the waveform as shown in FIG. 3(J) and further differentially formed into a sample gate pulse as shown in FIG. 3(K). This sample gate pulse is fed to a sample hold circuit 19.

On the other hand, a drum pulse as shown in FIG. 3(A) is obtained from a drum pulse detection magnetic head 22, at a rate of one pulse for each one rotation of the rotary disk 12. More particularly, a small magnet 21 is mounted on a disk 20 which rotates coaxially and integrally wtih the rotary disk 12. The drum pulse is obtained when the magnetic head 22 produces an output signal responsive to the magnet 21 passing the head. This output signal triggers a forming monostable multivibrator 23. The multivibrator 23 generates a rectangular wave as shown in FIG. 3(B). Supplied with this rectangular wave, a bistable multivibrator 24 generates a symmetrical rectangular wave as shown in FIG. 3(C). The output rectangular wave signal of the multivibrator 24 is applied to three systems. The divided signals are respectively supplied through a contact 25*a* of relay switch 25, to a trapezoid circuit 27, and voltage control delay multivibrator 28.

The rectangular wave signal fed through the contact 25*a* from the multivibrator 24, is supplied through a contact member of the switch 25 to a control signal recording and reproducing magnetic head 26. The magnetic head 26 records this signal, as a control signal, in a control track $t_2$ on the magnetic tape 14. Also, the rectangular wave signal supplied to the trapezoid circuit 27 is formed into a trapezoidal wave which has sloping leading and trailing edges, having gradients inclined at a definite angle, as shown in FIG. 3(D). The output trapezoidal wave, of the trapezoid circuit 27, is supplied to the sample hold circuit 19 and a second sample hold circuit 31. The sample hold circuit 19 holds the sample gate pulse supplied from the frequency dividing circuit 18, as shown in FIG. 3(K). The front edge of the trapezoidal wave, as shown in FIG. 3(D), is supplied from the trapezoid circuit 27 to the hold circuit 19, where it is compared in phase with the sample. The output phase difference error signal of the sample hold circuit 19 is supplied, through a phase compensation circuit 34, and a DC amplification and inversion circuit 35, to a control input terminal 30 of a voltage control delay multivibrator 28.

In the voltage control delay multivibrator 28, the rectangular wave signal, as shown in FIG. 3(C), supplied from the multivibrator 24, is controlled by the difference error signal supplied from the terminal 30, and thereby converted into a signal as shown in FIG. 3(E). Furthermore, the signal of FIG. 3(E) is differentially formed and supplied to the sample hold circuit 31 as a sample gate pulse as shown in FIG. 3(F). In the sample hold circuit 31, the rear edge of the signal as shown in FIG. 3(D) supplied from the trapezoid circuit 27, and the sample gate pulse supplied from the multivibrator 28 as shown in FIG. 3(F), are compared in phase. A phase difference error voltage is supplied by the sample hold circuit 31, the error voltage being nearly proportional to the drum pulse frequency.

Further, in the sample hold circuit 31, the position of a delayed side edge P, of the output waveform of the voltage delay control multivibrator 28 as shown in FIG. 3(E), is jointly controlled by a manual presetting adjuster 29 and the input control voltage supplied from the terminal 30. The output difference error voltage of the sample hold circuit 31 is amplified by a DC amplifier 32. Thereafter, it is supplied to a DC motor 33 for driving the rotary disk 12, having the rotary magnetic heads 13*a* and 13*b*. The DC motor 33 is rotated at a rotation speed of 30 rotations per second.

The magnetic tape 14 is pulled by a pinch roller 38 and a capstan 37, which is rotated by a capstan motor 36. The video signal is recorded, on the running magnetic tape 14, in the parallel oblique tracks $t_1$ by the rotary magnetic heads 13*a* and 13*b* rotated by the DC motor 33, as described.

In a reproducing mode, the contact members of the relay switches 17 and 25 are respectively changed over and connected to contact points 17*b* and 25*b*. The control signal reproduced from the control track $t_2$, on the magnetic tape 14, by the control head 26 is a signal of a waveform as shown in FIG. 3(L). This reproduced control signal is supplied through the switch 25 to an amplifier 39 and a monostable multivibrator 40, in succession. From the multivibrator 40 is taken out a signal of a waveform as shown in FIG. 3(M). The position of a side edge Q of the waveform of FIG. 3(M) is controlled by a tracking adjuster 41. The output signal of the multivibrator 40 is supplied through the switch 17 to the frequency dividing circuit 18. The supplied signal of FIG. 3(M) actuates the frequency dividing circuit 18, by its side edge Q. The output of the frequency dividing circuit 18 is supplied to the voltage control terminal 30 of the delay multivibrator 28, as described in the recording mode, and this controls the DC motor 33 for driving the head disk 12.

Figure 2:
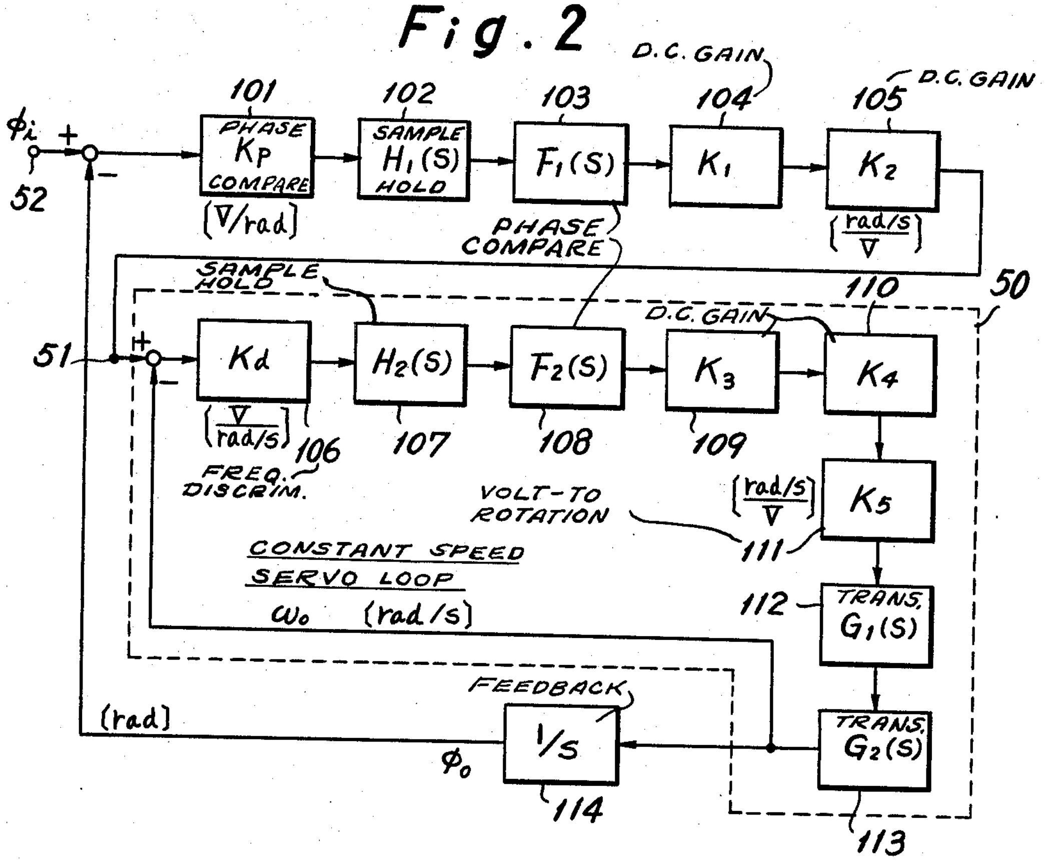
FIG. 2 is a block diagram illustrating, by elements, the principle of operation of the system according to the invention.

FIG. 2 is a block diagram showing elements of the servo system for synchronizing the transfer functions of $G_1(s)$ and $G_2(s)$ of the rotary magnetic head mechanism, with reference phase input $\phi_1$. In the figure, a constant speed servo loop 50 comprises a frequency discriminator sensitivity circuit $$\left(Kd\left[\frac{V}{\text{rad/s}}\right]\right)\ 106$$

sample hold circuit $(H_2(s))$107, a phase compensation circuit $(F_2(s))$108, DC gain circuits ($K_3$ and $K_4$)109 and 110 to a motor, and a motor voltage-to-rotation conversion coefficient circuit $$\left(K_5\left[\frac{\text{rad/s}}{V}\right]\right)\ 111$$

and transmission function circuits ($G_1(s)$ and $G_2(s)$)112 and 113. The target value of the servo loop 50 is controlled by the phase servo difference error voltage supplied through terminal 51. A reference phase input signal $\phi_1$ from a terminal 52 and a drum pulse phase signal $\phi_0$[rad] from the element (1/S) 114 are supplied to a phase comparator sensitivity circuit $$\left(Kp\left[\frac{V}{\text{rad}}\right]\right)\ 101$$

The phase servo difference error voltage supplied to the terminal 51 is obtained by the phase comparator sensitivity circuit ($Kp$)101, sample hold circuit ($H_1(s)$)102, phase compensation circuit ($F_1(s)$)103, and DC gain circuits $$\left(K_1 \text{ and } K_2\left[\frac{\text{rad}/s}{V}\right]\right)\ 104 \text{ and } 105$$

The DC gain circuit ($K_2$)105 is a conversion sensitivity, of a frequency, with respect to the control voltage of the voltage control delay multivibrator 28 and has a good linearity. The output $\omega_0$ rad/$s$ of the transmission function circuit ($G2(s)$)113 is fed back to the frequency discriminator sensitivity circuit ($Kd$)106.

FIG. 4 illustrates a theoretical circuit of the trapezoid circuit 27. The rectangular wave, as shown in FIG. 5(A), is applied through an input terminal 60 to a base of a transistor 61. The transistor 61 is in conductance during a positive period of the rectangular wave. Collector current $Ic_1$ of the transistor 61 tends to become a saturation current, and the collector voltage $Vc_1$ tends to become a nearly zero potential. Capacitors 62 and 63 pass currents, respectively, in the arrow directions. During this period, diode 64 is reverse-biased and in an OFF (nor-conductive) state. Resistor 65 is in high resistance so that the charging current of the capacitor 62 is nearly negligible. Accordingly, the effect of the circuit shown in FIG. 4 is nearly same as the effect of a circuit with resistor 65 and capacitor 62 removed. This circuit performs almost the same functions as a Miller integration circuit constituted of a resistor 66, capacitor 63, and transistor 61.

Generally, when a rectangular wave is applied in the Miller integration circuit, a trapezoidal wave is obtained as an output, having the leading and trailing edges reversed in direction and having the same inclination gradient. However, in the system of this invention, the inclination of the leading edge of the trapezoidal wave is required to be longer than the inclination of the trailing edge. In consequence, the circuit as shown in FIG. 4 is constituted such that, when the transistor 61 is in OFF state during the negative period of the input rectangular wave, the diode 64 is in an ON (conductive) state, and the capacitors 62 and 63 are parallel with respect to each other. Therefore, from an output terminal 67, there is obtained an output trapezoidal wave as shown in FIG. 5(B) (same as the trapezoidal wave as shown in FIG. 3(D)).

Figure 5:
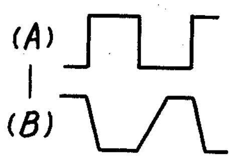

FIG. 6 is a circuit diagram of an actual embodiment of the trapezoid circuit as shown in FIG. 5. In FIGS. 5 and 6, identical parts are denoted by identical reference numerals and the detailed explanations thereof are therefore omitted. The circuit of FIG. 6 is constructed such that the output impedance of the transistor 61 is lowered, and the linearity of inclination of the trapezoidal wave is improved. The inclination of the rising gradient is changed over in the recording mode or the reproducing mode. In the recording mode, a terminal 68 is biased with a positive voltage. A diode 69 is biased in an ON state, and a diode 70 is biased in OFF state. A capacitor 71 is out of this relationship.

In the reproducing period, the terminal 68 is not supplied a voltage so that the diode 69 is in an OFF state and the diode 70 is in an ON state. At this instant, the capacitor 71 is effectively connected in parallel with the capacitor 62. Therefore, as shown in FIG. 7, the leading edge of the trapezoidal wave is assumed to have a rise time gradient of $T_2$ in the reproducing period. This edge has a rise time gradient of $T_1$ during the recording period. The fall time $T_3$ of the trailing edge of the trapezoidal wave is constant depending on the value of the capacitor 63. Values of circuit elements are as follows:

| | |
|---|---|
| Resistor: | |
| 65 | 47KΩ. |
| 66 | 10KΩ. |
| 72 | 4.7KΩ. |
| 73 | 22KΩ. |
| 74 | 100KΩ. |
| 75 | 10KΩ. |
| 76 | 100KΩ. |
| 100 | 100KΩ. |
| 115 | 100KΩ. |
| Capacitor: | |
| 62 | 0.047 μf. |
| 63 | 0.022 μf. |
| 71 | 0.15 μf. |
| 77 | 10 μf. |
| 80 | 10 μf. |
| Diode: | |
| 64 | DA–90. |
| 69 | DA–90. |
| 70 | DA–90. |
| Transistor: | |
| 61 | |
| 78 | 2SC838. |
| 79 | 2SA564. |

FIG. 8 is a circuit diagram of an embodiment of the voltage control delay multivibrator 28 which is employed as the voltage control frequency discriminator. When a terminal 81 is supplied with a negative trigger pulse, a transistor 82 is switched to an ON state, and a transistor 83 is switched to an OFF state. The time until the ON-OFF states of the transistors 82 and 83 are reversed is designated by $t$. The reversal condition is given by the following formula.

$$(Vcc+V_B)(1-\epsilon^{t/CR'})-Vcc=0 \qquad (1)$$

Solving the Formula 1 for time $t$, the following formula is obtained $$t=CR'\ln\left(1+\frac{Vcc}{V_B}\right) \qquad (2)$$

$$R'=R+(R_1//R_2)$$

Here, if it is designed that $R_1 // R_2 \ll R$ $$R'\doteqdot R$$

$$V_B \approx \tfrac{1}{2}(V_{CTL}+Vcc) \qquad (3)$$

where $V_{CTL}$ is the collector voltage of the transistor 84. From the Formulas 2 and 3, the following formula is obtained:

$$\tau=t=CR\ln\left(\frac{V_{CTL}+3Vcc}{V_{CTL}+Vcc}\right) \qquad (4)$$

The delay multivibrator is used for the frequency discriminator to form the constant speed servo loop. Then, the preset frequency with respect to the voltage $V_{CTL}$ is $$f=K\cdot 1/\tau \qquad (5)$$

Formula 4 is applied in Formula 5 and $V_{CTL}$ is differentiated. Then, $$\frac{df}{dV_{CTL}}=\frac{1}{\left[\ln\left(\frac{V_{CTL}+3Vcc}{V_{CTL}+Vcc}\right)\right]^2}\cdot\frac{2Vcc}{(V_{CTL}+3Vcc)(V_{CTL}+Vcc)} \qquad (6)$$

Here, the following series expansion formula can be applied $$\ln X=2\left[\frac{X-1}{X+1}+\frac{1}{3}\left(\frac{X-1}{X+1}\right)^3+\frac{1}{5}\left(\frac{X-1}{X+1}\right)^5+\cdots\right](X>0) \quad (7)$$

Therefore, $$\ln\left(\frac{V_{CTL}+3Vcc}{V_{CTL}+Vcc}\right)=2\left[\frac{Vcc}{V_{CTL}+2Vcc}+\frac{1}{3}\left(\frac{Vcc}{V_{CTL}+2Vcc}\right)+\cdots\right] \quad (8)$$

In case of $V_{CTL}=0$, the first term of the Formula 8 is 1.0, second term, 0.082, and third term, 0.012 . . . Also, as ln X is entered in the Formula 6 as a square, the second term is 0.0067 and the rest of the following terms can be neglected. The formula 6 is given by $$\frac{df}{dV_{CTL}}=\frac{2Vcc}{4V^2cc\,\dfrac{V^2_{CTL}+4VccV_{CTL}+3V^2_{CTL}}{V^2_{CTL}+4VccV_{CTL}+4V^2_{CTL}}}\approx\frac{2}{3Vcc} \quad (9)$$

Thus, the variation of frequency $f$ with respect to voltage $V_{CTL}$ is almost linear. For instance, if the voltage $Vcc$ is 12 v., there is obtained a variation of frequency ($f$) of 0.0555 (5.55%) per 1 v. of $V_{CTL}$, ($K=1$). Here, a terminal 97 is the terminal for applying a voltage $Vcc$ (+12 v.), terminal 98 is an output terminal, and terminal 99 is a terminal for grounding.

Values of circuit elements of the circuit in FIG. 8 are as follows:

| | |
|---|---|
| Resistor: | |
| 85 | 100KΩ. |
| 86 | 22KΩ. |
| 87 | 3.3KΩ. |
| 88 | 22KΩ. |
| 89 | 47KΩ. |
| 90 | 2.2KΩ. |
| 91 | 1KΩ. |
| 92 | 47KΩ. |
| 93 | 100KΩ. |
| 116 | 3.3KΩ. |
| Variable resistor: | |
| 96 | 100KΩ. |
| Capacitor: | |
| 94 | 0.01 μf. |
| 95 | 0.33 μf. |
| Transistor: | |
| 82 | 2SC838. |
| 83 | 2SC838. |
| 84 | 2SC838. |

The servo system according to the invention, which is constituted as described, has the following features and advantages:

(1) In the event where a DC motor is employed for a driving motor of the rotary body, the gain of the DC amplifier including the motor driving amplifier may be low (for example, the gain G is 1 or thereabout). Thus, a stable servo operation can be attained by a simple system.

(2) The constant speed servo loop can be designed separately from the phase servo loop. Thus, a preseting of the gains of both loops can be facilitated.

(3) Linearity of frequency characteritsics, with respect to the delay multivibrator control voltage, is very good. A followup range for the reference frequency can be made larger.

(4) The loop gain of the constant speed servo loop can be elevated. Therefore, the free-run frequency of the motor rotation can be maintained fairly stable when the reference signal is absent.

(5) The rotation speed of the rotary magnetic heads can be maintained stably with respect to the variation of the load torque of the motor.

(6) The phase of the reference signal (for example, the vertical synchronizing signal of the video signal in the recording period and the control track pulse during the reproducing period) can be made constant, relative to the phase of rotation of the rotary body. This phase relationship can be maintained constant even when their frequencies are changed.

(7) The variation in the frequency of the reference signal in the reproducing signal (due to wow, flutter and the like of the magnetic tape, for example) does not affect the rotation of the rotary body.

(8) It is capable of bringing the servo system into a normal synchronized condition even if the reference signal and the free running frequency of rotation of the rotary body are different.

What I claim is:

1. A rotary servo system with a single feedback loop with a DC amplifier means therein, said system comprising drive means for rotating a rotary body, means for generating a rotation signal in response to the rotational speed of the rotary body, means for supplying a reference signal, means for phase comparing the rotation signal supplied from the signal generating means and the reference signal supplied from the supplying means to provide a voltage level corresponding to the phase difference, and frequency discrimination means comprising only one trapezoidal circuit operated responsive to the phase error output voltage level signal of the phase comparing means and the rotation signal from the signal generating means, said frequency discrimination means comprising means for controlling the rotation signal from the signal generating means by the phase error output from the phase comparing means so as to obtain a sampling signal and a second phase comparing means for phase comparing the rotation signal from the signal generating means with the sampling signal from the controlling means, said frequency discrimination means generating an error output signal responsive to the difference between a preset frequency and the rotation signal, wherein a preset frequency of the frequency discrimination means is controlled by the phase error output of the phase comparing means, and said rotation drive means is controlled by output of the frequency discrimination means.

2. The system of claim 1 for use in a magnetic recording and reproducing apparatus having a magnetic medium and a means for driving the magnetic medium, said rotary body comprises at least one rotary magnetic head for recording and reproducing a video signal on and from the magnetic medium, and said reference signal supplying means is a means for separating vertical synchronizing signal from the video signal in the recording period.

3. The system of claim 1 for use in a magnetic recording and reproducing apparatus having a magnetic medium, means for driving the magnetic medium, and means for recording and reproducing the rotation signal as a control signal on and from the magnetic medium, in which said rotary body comprises at least one rotary magnetic head for recording and reproducing a video signal on and from the magnetic medium, and the reference signal supplying means comprises means for supplying the control signal reproduced from the magnetic medium by the control signal recording and reproducing means in the reproducing period.

4. The system of claim 1, in which said rotation driving means includes a DC motor and a DC amplifier for driving the DC motor, and the DC amplifier has a relatively low gain and amplifies the error output of the frequency discrimination means.

5. A rotary servo system with a single feedback loop with a DC amplifier means therein, said system comprising drive means for rotating a rotary body, means for generating a rotation signal in response to the rotational speed of the rotary body, means for supplying a reference signal, means for phase comparing the rotation signal supplied from the signal generating means and the reference signal supplied from the supplying means to provide a voltage level corresponding to the phase difference, frequency discrimination means comprising only one trapezoidal circuit operated responsive to the phase error output voltage level signal of the phase comparing means and the rotation signal from the signal generating means, said trapezoid circuit generating a trapezoidal wave responsive to the rotation signal supplied from the signal generating means, voltage control delay multivibrator means for controlling the rotation signal responsive to the phase error output voltage from the phase comparing means and for generating a sampling gate pulse, and sample hold circuit means for phase comparing the trapeozidal wave supplied from the trapezoid circuit with the gate pulse supplied from the multivibrator and for generating an error output voltage, said frequency discrimination means generating an error output signal responsive to the difference between a preset frequency and the rotation signal, wherein a preset frequency of the frequency discrimination means is controlled by the phase error output of the phase comparing means, and said rotation drive means is controlled by output of the frequency discrimination means.

6. The system of claim 5, in which said phase comparator means is a sample hold circuit to phase compare the reference signal from the supplying means with the trapezoidal wave from the trapezoid circuit and generate the phase error output.

7. A rotary servo system comprising a drive means for rotating a rotary body, means for generating a rotation signal in response to the rotation of the rotary body, means for supplying a reference signal, means for phase comparing the rotation signal with the reference signal and producing a phase error signal having a voltage corresponding to the phase difference between the rotation signal and the reference signal, voltage controlled oscillator means responsive to said phase error signal for generating an output signal having a frequency controlled in response to the voltage level of said phase error signal, said frequency being equal to a preset frequency when the voltage level of said phase error signal indicates a zero error, means for comparing in frequency the rotation signal and the output signal of the voltage controlled oscillator means, means responsive to said last named comparison for producing a frequency error signal corresponding to the frequency difference between the rotation signal and said output signal, and means responsive to the frequency error signal for controlling the rotation speed of the rotary body.

8. The system of claim 7 and means whereby said servo system is used in a magnetic recording and reproducing apparatus having a magnetic medium and means for driving the magnetic medium, said rotary body comprising at least one rotary magnetic head for recording and reproducing a video signal on and from the magnetic medium, and said reference signal supplying means comprising means for separating the vertical synchronizing signal from the video signal in the recording period.

9. The system of claim 7 and means whereby said servo system is used in a magnetic recording and reproducing apparatus having a magnetic medium, means for driving the magnetic medium, means for recording on and reproducing from the magnetic medium the rotation signal as a control signal, said rotary body comprising at least one rotary magnetic head for recording on and reproducing from the magnetic medium a video signal, and the reference signal supplying means comprising means for supplying the control signal reproduced from the magnetic medium by the control signal recording and reproducing means in the reproducing period.

10. The system of claim 7, in which said driving means includes a DC motor and a DC amplifier for driving the DC motor, the DC amplifier having a gain which is substantially equal to one and amplifying the frequency error signal of the voltage controlled oscillator means.

11. The system of claim 7 further comprising trapezoid circuit means responsive to the rotation signal for generating a trapezoidal wave signal, and means responsive to the reference signal for generating first sampling pulses, said phase comparing means including first sample holding circuit means for gating the front edge of the trapezoidal wave signal responsive to the first sampling pulses and holding the gated signal to produce said phase error signal, said voltage controlled oscillator means including voltage control delay multivibrator means for generating a square wave signal, the leading edge of said square wave signal being synchronized with the rotation signal and the trailing edge of said square wave signal being controlled in phase responsive to the voltage level of said phase error signal, means responsive to the trailing edge of the square wave signal for generating second sampling pulses, and said frequency comparing means including second sample holding circuit means for gating the rear edge of the trapezoidal wave signal responsive to the second sampling pulses and holding the gated signal to produce the frequency error signal.

References Cited

UNITED STATES PATENTS

| | | | |
|---|---|---|---|
| 3,361,949 | 1/1968 | Brown | 318—314 |
| 3,542,950 | 11/1970 | Luther | 178—6.6 P |
| 3,520,993 | 7/1970 | Jacoby | 178—6.6 P |

HOWARD W. BRITTON, Primary Examiner

U.S. Cl. X.R.

318—314